(12) United States Patent
Choi (10) Patent No.: US 8,861,128 B2
(45) Date of Patent: Oct. 14, 2014

(54) BASE ASSEMBLY AND RECORDING DISK DRIVING DEVICE HAVING THE SAME

(71) Applicant: Samsung Electro-Mechanics Co., Ltd., Suwon (KR)

(72) Inventor: Jong Min Choi, Suwon (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 13/852,112

(22) Filed: Mar. 28, 2013

(65) Prior Publication Data

US 2014/0177096 A1  Jun. 26, 2014

(30) Foreign Application Priority Data

Dec. 20, 2012  (KR) .................. 10-2012-0149145

(51) Int. Cl.
  *G11B 33/14* (2006.01)
  *G11B 19/20* (2006.01)

(52) U.S. Cl.
  CPC .................. *G11B 19/2009* (2013.01)
  USPC ...................................... 360/97.16

(58) Field of Classification Search
  CPC ....... G11B 33/14; G11B 33/146; B01D 46/00
  USPC .......... 360/97.16, 97.14, 97.13, 97.15, 97.19, 360/99.15, 99.23, 99.13, 99.22
  See application file for complete search history.

(56) References Cited

U.S. PATENT DOCUMENTS

| | | | | |
|---|---|---|---|---|
| 4,739,589 A * | 4/1988 | Brehm et al. | ................... | 451/41 |
| 6,238,467 B1 * | 5/2001 | Azarian et al. | ................. | 96/135 |
| 6,296,691 B1 * | 10/2001 | Gidumal | ........................... | 96/17 |
| 6,389,869 B1 | 5/2002 | Wakita et al. | | |
| 6,395,073 B1 * | 5/2002 | Dauber | ........................... | 96/134 |
| 7,019,941 B2 * | 3/2006 | Yoo | ............................. | 360/97.17 |
| 7,291,208 B2 * | 11/2007 | Dauber et al. | .................. | 96/134 |
| 7,312,950 B2 * | 12/2007 | Voights et al. | ............. | 360/97.14 |
| 7,382,572 B1 * | 6/2008 | Turner et al. | ............... | 360/97.16 |
| 7,591,868 B2 * | 9/2009 | Johnson | ....................... | 55/385.6 |
| 7,727,297 B2 * | 6/2010 | Dauber et al. | ............... | 55/385.6 |
| 8,033,304 B2 * | 10/2011 | Tuma | ................................ | 141/8 |
| 8,102,619 B2 * | 1/2012 | Chan et al. | ................. | 360/97.16 |
| 8,369,043 B2 * | 2/2013 | Kong et al. | ................. | 360/97.17 |
| 8,585,793 B2 * | 11/2013 | Bishop et al. | ................... | 55/486 |
| 8,605,385 B1 * | 12/2013 | Song et al. | ................. | 360/99.08 |

(Continued)

FOREIGN PATENT DOCUMENTS

| | | |
|---|---|---|
| JP | 63-124283 | 5/1988 |
| JP | 2-172086 | 7/1990 |

(Continued)

OTHER PUBLICATIONS

Korean Office Action issued Dec. 18, 2013 in corresponding Korean Patent Application No. 10-2012-0149145.
Japanese Office Action mailed Feb. 12, 2014 in corresponding Japanese Application No. 2013-079567.

*Primary Examiner* — Allen T Cao (57) ABSTRACT

There is provided a base assembly including: a base member having a disk accommodating part onto which a disk is insertedly disposed; and a filter member installed on the base member so as to be disposed adjacently to the disk, wherein the base member is formed by performing plastic processing on a steel sheet and includes a mounting part for fixedly installing the filter member.

11 Claims, 6 Drawing Sheets

(56) References Cited

U.S. PATENT DOCUMENTS

| | | | |
|---|---|---|---|
| 8,638,524 B2* | 1/2014 | Brown | 360/97.17 |
| 2003/0056653 A1* | 3/2003 | Ueki et al. | 96/134 |
| 2005/0185327 A1* | 8/2005 | Voights et al. | 360/97.03 |
| 2008/0310277 A1 | 12/2008 | Iwase | |
| 2010/0118437 A1* | 5/2010 | Kong et al. | 360/97.02 |
| 2010/0238590 A1 | 9/2010 | Tashiro et al. | |
| 2012/0118158 A1* | 5/2012 | Tuma | 96/151 |
| 2013/0088795 A1* | 4/2013 | Brown | 360/97.14 |

FOREIGN PATENT DOCUMENTS

| | | |
|---|---|---|
| JP | 2000-245122 | 9/2000 |
| JP | 2001-43657 | 2/2001 |
| JP | 2001-184835 | 7/2001 |
| JP | 2002-335084 | 11/2002 |
| JP | 2008-310938 | 12/2008 |
| JP | 2010-225207 | 10/2010 |
| KR | 10-2010-0051932 | 5/2010 |

* cited by examiner

BASE ASSEMBLY AND RECORDING DISK DRIVING DEVICE HAVING THE SAME

CROSS-REFERENCE TO RELATED APPLICATIONS

This application claims the priority of Korean Patent Application No. 10-2012-0149145 filed on Dec. 20, 2012, in the Korean Intellectual Property Office, the disclosure of which is incorporated herein by reference.

BACKGROUND OF THE INVENTION

1. Field of the Invention

The present invention relates to a base assembly and a recording disk driving device having the same.

2. Description of the Related Art

A hard disk drive (HDD), a computer information storage device, reads data stored on a disk or writes data to a disk using a magnetic head.

In such a hard disk drive, a base has a head driver installed thereon, that is, a head stack assembly (HSA), capable of moving a position of the magnetic head relative to the disk. The magnetic head performs its function while moving to a desired position in a state in which it is suspended above a writing surface of the disk by the head driver at a predetermined height.

According to the related art, in the manufacturing of a base provided in the hard disk drive, a post-processing scheme of die-casting aluminum (Al) and then removing burrs, or the like therefrom, generated due to die-casting, has been used.

However, in the die-casting scheme according to the related art, since a process of injecting aluminum (Al) in a molten state for casting to form a cast component is performed, high levels of temperature and pressure are required, such that a large amount of energy may be required for the process and a process time may be increased.

Further, in terms of a lifespan of a die-casting mold, there may be a limitation in manufacturing a large number of bases using a single mold, and a base manufactured by the die-casting process may have poor dimensional precision.

Therefore, in order to solve problems in the die-casting process, the base has been manufactured using press processing. However, in the case of manufacturing the base through press processing, the base inevitably has a uniform thickness, due to a process of press processing and bending a plate.

Therefore, it may be difficult to configure a mounting part for installing a filter member. Therefore, a filter mounting member for installing the filter member may be separately manufactured and mounted on the base, but manufacturing costs may be increased by separately manufacturing the filter mounting member.

RELATED ART DOCUMENT (Patent Document 1) Japanese Patent Laid-open Publication No. 2000-245122
(Patent Document 2) Japanese Patent Laid-open Publication No. 2002-335084

SUMMARY OF THE INVENTION

An aspect of the present invention provides a base assembly having a mounting part for installing a filter member in a base member simply formed by plastic processing, and a recording disk driving device having the same.

According to an aspect of the present invention, there is provided a base assembly including: a base member having a disk accommodating part onto which a disk is insertedly disposed; and a filter member installed on the base member so as to be disposed adjacently to the disk, wherein the base member is formed by performing plastic processing on a steel sheet and includes a mounting part for fixedly installing the filter member.

The mounting part may include an installation hole formed in the base member and a pin member insertedly installed in the installation hole.

The pin member may include a plurality of first pin members supporting front and rear surfaces of the filter member and a second pin member supporting at least one of both sides of the filter member.

The plurality of first pin members may be disposed in a zigzag manner and formed to be thinner than the second pin member.

The mounting part may further include a protrusion part protruded so as to support at least one of both sides of the filter member.

The pin member may include a plurality of pin members supporting front and rear surfaces of the filter member and disposed in a zigzag manner.

The mounting part may include a support plate cut from the base member to be bent and a protrusion part protruding so as to support at least one of both sides of the filter member.

The support plate may include a first support plate supporting one surface of the filter member and a second support plate supporting the other surface of the filter member, and the first and second support plates may be disposed in a zigzag manner.

The base assembly may further include a sealing member installed on a bottom surface of the base member to be disposed below the support plate.

The mounting part may include an installation hole formed in the base member, a support plate cut from the base member to be bent, and a pin member insertedly installed in the installation hole so as to support at least one of both sides of the filter member.

The support plate may include a first support plate supporting one surface of the filter member and a second support plate supporting the other surface of the filter member, and the first and second support plates may be disposed in a zigzag manner.

According to another aspect of the present invention, there is provided a recording disk driving device including: the base assembly as described above; a head transfer part transferring a head reading information stored on a recording disk to a position above the recording disk; and a housing forming a space for receiving the head transfer part together with the base assembly.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Hereinafter, embodiments of the present invention will be described in detail with reference to the accompanying drawings.

The invention may, however, be embodied in many different forms and should not be construed as being limited to the embodiments set forth herein. Rather, these embodiments are provided so that this disclosure will be thorough and complete, and will fully convey the scope of the invention to those skilled in the art.

In the drawings, the shapes and dimensions of elements may be exaggerated for clarity, and the same or like reference numerals will be used throughout to designate the same or like elements.

Figure 1:
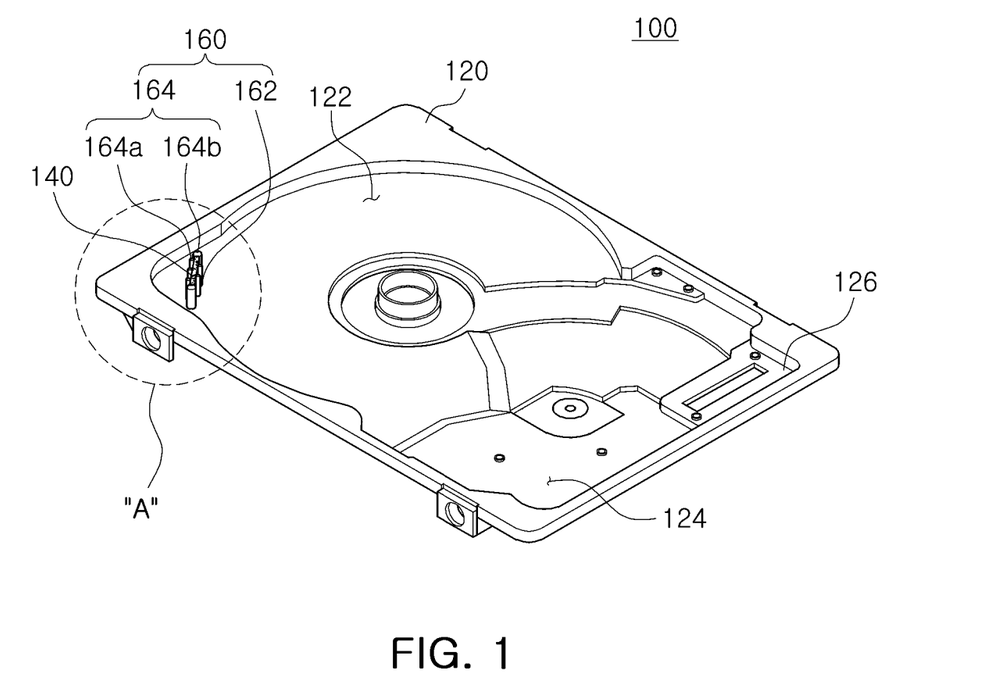
FIG. 1 is a schematic perspective view showing a base assembly according to an embodiment of the present invention.
Figure 2:
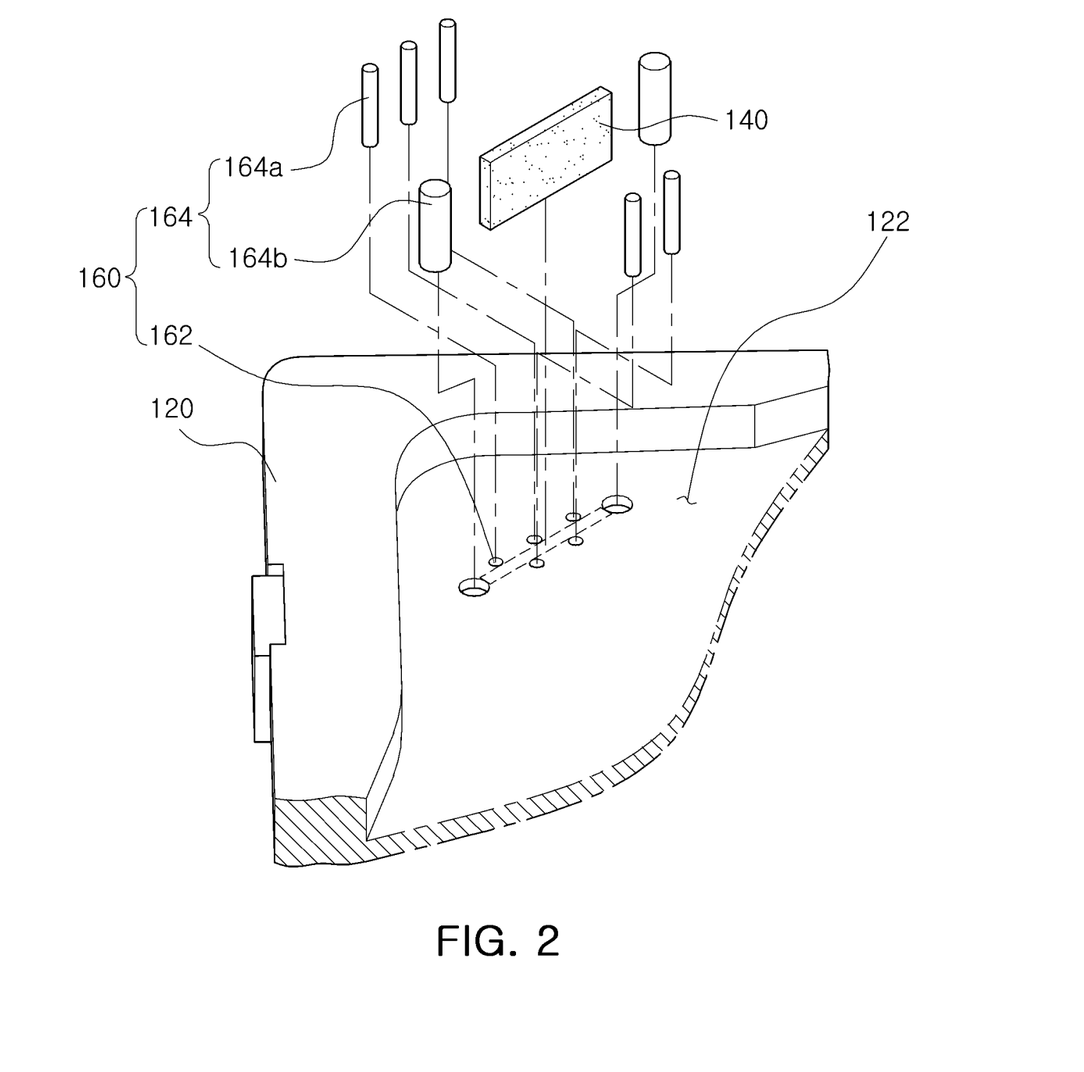
FIG. 2 is an exploded perspective view of part A of FIG. 1.

FIG. 1 is a schematic perspective view showing a base assembly according to an embodiment of the present invention, and FIG. 2 is an exploded perspective view of part A of FIG. 1.

Referring to FIGS. 1 and 2, a base assembly 100 according to the embodiment of the present invention may include a base member 120 and a filter member 140.

The base member 120 may be formed by plastic processing (for example, press processing). In addition, the base member 120 may form a housing forming an outer casing together with a cover 510 (See FIG. 6) in a recording disk driving device 500 (See FIG. 6).

Meanwhile, the base member 120 may include a disk accommodating part 122, a head stack assembly mounting part 124, and a bracket device mounting part 126.

That is, after the disk accommodating part 122, the head stack assembly mounting part 124, and the bracket device mounting part 126 are formed to have basic shapes by the press processing, a shape of the final base member 120 may be formed by additional processing such as bending or cutting.

That is, the base member 120 according to the embodiment of the present invention may be manufactured by performing a single process through press processing or by performing a single process and additional processing, unlike the post-processing scheme according to the related art in which aluminum (Al) is die-cast and burrs, or the like, generated due to the die-casting, are then removed.

In other words, the base member 120 may be formed by disposing a cold rolled steel sheet (SPCC, SPCE, or the like), a hot rolled steel sheet, a stainless steel sheet, or a lightweight alloy steel sheet such as a boron or magnesium alloy on a press die and applying a predetermined amount of pressure thereto.

As described above, since the base member 120 is formed by the press processing, a processing time and energy consumption may be significantly reduced. As a result, a manufacturing yield may be improved.

Meanwhile, the disk accommodating part 122 is a portion of the base member 120 on which a disk D (See FIG. 6) is disposed, and may have a roughly circular shape. More specifically, the disk accommodating part 122 may be a portion of the base member 120 partially depressed downwardly so that the disk D is accommodated thereon.

In addition, the head stack assembly mounting part 124 may be disposed adjacently to the disk accommodating part 122 and allow a head stack assembly (HAS) 520 (See FIG. 6) to be mounted thereon.

Further, the bracket device mounting part 126 may be disposed adjacently to the head stack assembly mounting part 124 and allow a bracket device 565 (See FIG. 6) to be mounted thereon.

In addition, the disk accommodating part 122, the head stack assembly mounting part 124, and the bracket device mounting part 126 may be formed simultaneously by press processing and may be stepped.

Meanwhile, a mounting part 160 for fixedly installing the filter member 140 may be provided in the base member 120. That is, the mounting part 160 may be disposed at an edge portion of the disk accommodating part 122.

In addition, the mounting part 160 may include installation holes 162 formed in the base member 120 and pin members 164 insertedly installed in the installation holes 162.

The plurality of installation holes 162 may be formed at the edge portion of the disk accommodating part 122. That is, the installation holes 162 may be formed to allow the pin members 164 to support a front surface, a rear surface, and at least one of both sides of the filter member 140.

In addition, the pin members 164 may include a plurality of first pin members 164a supporting the front and rear surfaces of the filter member 140 and a second pin member 164b supporting at least one of both sides of the filter member 140.

Further, the first pin member 164a may be formed to be thinner than the second pin member 164b so that air may smoothly pass through the filter member 140.

In addition, the first pin members 164a may be disposed in a zigzag manner. That is, the first pin member 164a supporting the front surface of the filter member 140 and the first pin member 164a supporting the rear surface thereof may be disposed to alternate with each other.

Meanwhile, although the case in which cross-sections of the first and second pin members 164a and 164b have a circular shape is described by way of example in the present embodiment, the present invention is not limited thereto. That is, the cross-sections of the first and second pin members 164a and 164b may have various shapes.

As described above, since the mounting part 160 for mounting the filter member 140 is configured of the installation holes 162 and the plurality of pin members 164, the configuration of the mounting part 160 may be further simplified.

That is, a separate filter mounting member need not be installed, such that manufacturing costs may be reduced.

The filter member 140 may be fixedly installed on the mounting part 160 so as to be disposed adjacently to the disk D.

That is, the filter member 140 may serve to filter particles from air flowing in the housing. Further, the filter member 140 may be formed of a filter medium through which air may pass in order to filter particles from the flowing air, for example, a porous material such as sponge.

In more detail, the particles removed by the filter member 140 will be described.

Microparticles generated in an assembly process may not be completely removed and may remain in the base member 120. In addition, the head stack assembly 520 (See FIG. 6) may strike a surface of the disk D in the case of an external impact during moving the recording disk driving device 500, to thereby generate the microparticles.

Further, microparticles may be generated due to friction between the head stack assembly 520 and a surface of a region for parking the disk D.

In the case in which the particles as described above are attached to the surface of the disk D, the disk D may be in a state in which data is unrecordable and unreadable.

In order to prevent this case, the filter member 140 may be installed adjacently to the disk D to remove the particles from the flowing air.

Meanwhile, although the case in which the filter member 140 is installed in a linear manner is described by way of example in the present embodiment, the filter member 140 may be installed on the mounting part 160 in an arc shape so as to correspond to the shape of the disk D.

As described above, since the mounting part 160 for mounting the filter member 140 is configured of the installation holes 162 and the plurality of pin members 164, the configuration of the mounting part 160 may be further simplified.

That is, a separate filter mounting member need not be installed, such that manufacturing costs may be reduced.

Hereinafter, a base assembly according to another embodiment of the present invention will be described with reference to the accompanying drawings. However, the same components as the above-mentioned components will be denoted by the same reference numerals and a detailed description thereof will be omitted.

Figure 3:
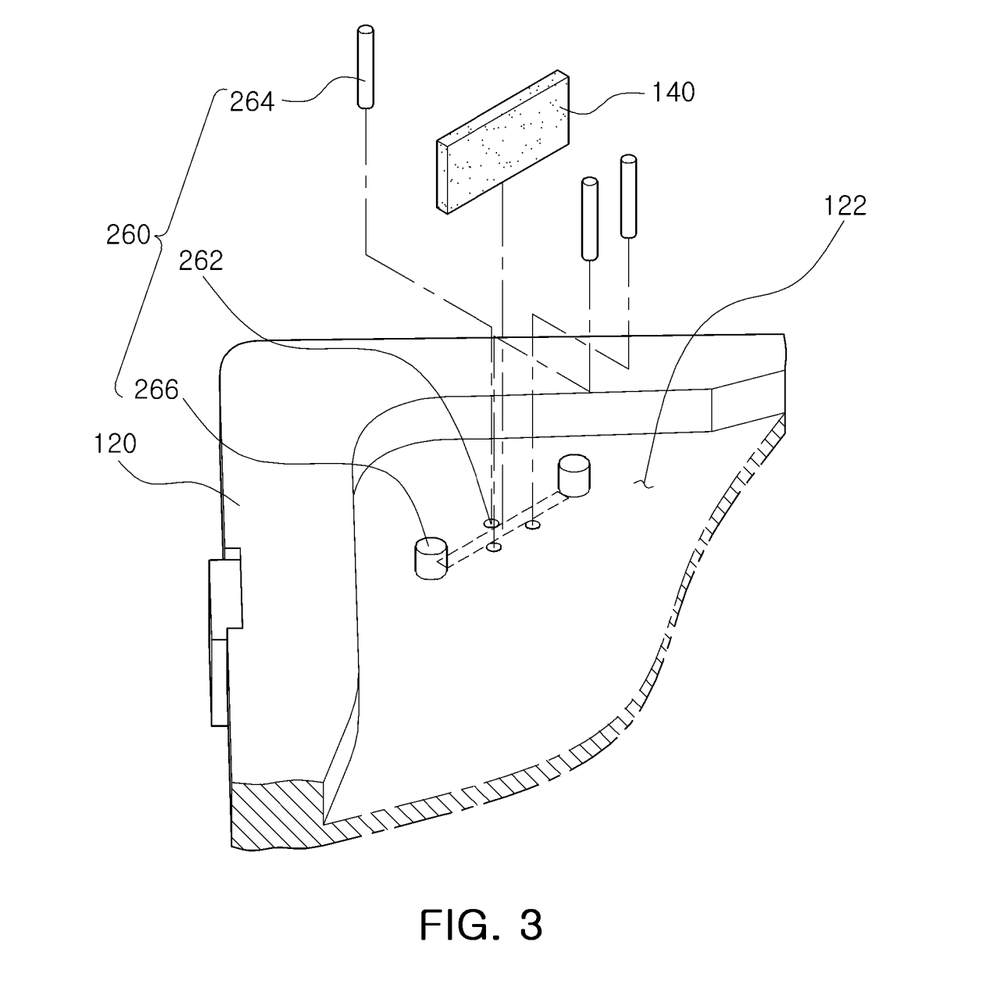
FIG. 3 is an exploded perspective view showing a portion of the base assembly corresponding to part A of FIG. 1 according to another embodiment of the present invention.

FIG. 3 is an exploded perspective view showing a portion of the base assembly corresponding to part A of FIG. 1 according to another embodiment of the present invention.

Since the base assembly according to another embodiment has the same configuration as that of the above-mentioned base assembly 100 according to the embodiment of the present invention, except for a mounting part 260 included therein, only the mounting part 260 will be described below.

The mounting part 260 may include installation holes 262 formed in the base member 120, pin members 264 inserted into the installation holes 262, and protrusion parts 266 protruding so as to support at least one of both sides of the filter member 140.

That is, the pin members 264 may be insertedly installed in the installation holes 262 so as to support the front and rear surfaces of the filter member 140, and the protrusion part 266 may protrude so as to support at least one of both sides of the filter member 140.

Meanwhile, the pin members 264 may be disposed in a zigzag manner. That is, the pin member 264 supporting the front surface of the filter member 140 and the pin member 264 supporting the rear surface thereof may be disposed to alternate with each other.

Meanwhile, although the case in which cross-sections of the pin members 264 have a circular shape is described by way of example in the present embodiment, the present invention is not limited thereto. That is, the cross-sections of the pin members 264 may have various shapes.

In addition, although the case in which the protrusion part 266 also has a circular shape when viewed from above is described by way of example in the present embodiment, the present invention is not limited thereto. The protrusion part 266 may have various shapes such as a rectangular shape, and the like.

As described above, since the mounting part 260 for mounting the filter member 140 is configured of the installation holes 262 and the plurality of pin members 264 and the protrusion parts 266, the configuration of the mounting part 260 may be further simplified.

That is, a separate filter mounting member need not be installed, such that manufacturing costs may be reduced.

Hereinafter, a base assembly according to another embodiment of the present invention will be described with reference to the accompanying drawings. However, the same components as the above-mentioned components will be denoted by the same reference numerals and a detailed description thereof will be omitted.

Figure 4:
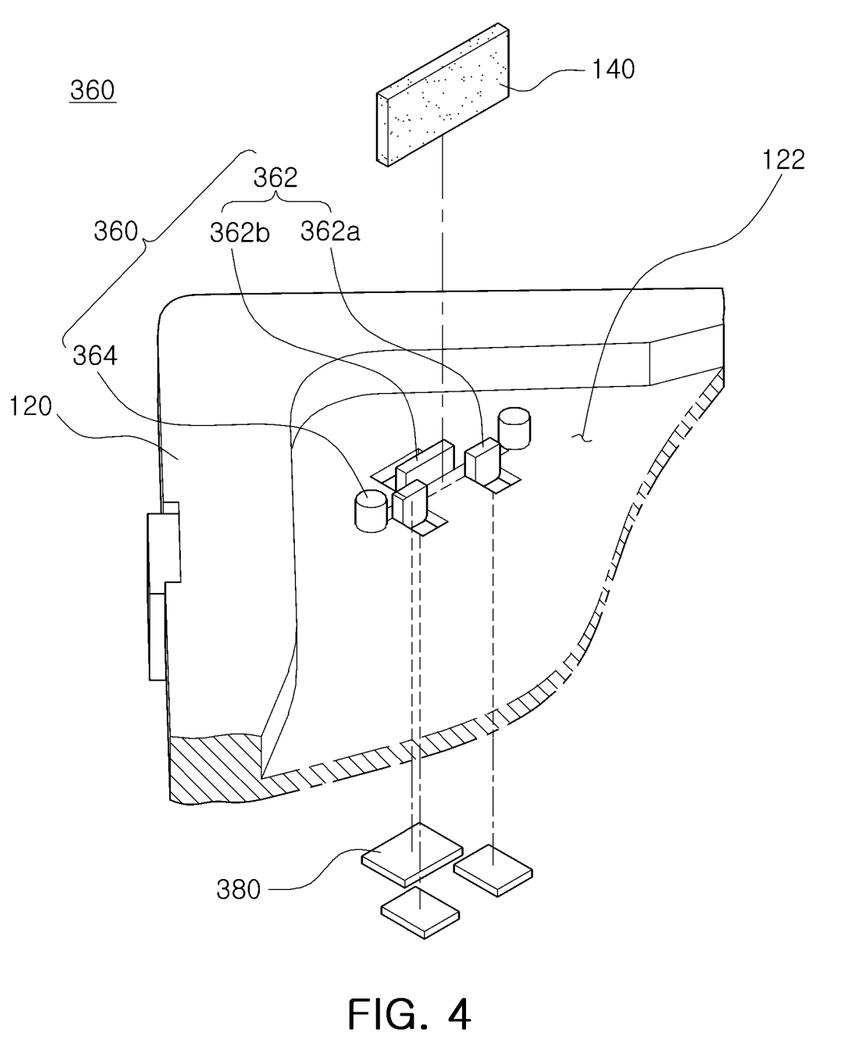
FIG. 4 is an exploded perspective view showing a portion of the base assembly corresponding to part A of FIG. 1 according to another embodiment of the present invention.

FIG. 4 is an exploded perspective view showing a portion of the base assembly corresponding to part A of FIG. 1 according to another embodiment of the present invention.

Meanwhile, since the base assembly according to another embodiment has the same configuration as that of the above-mentioned base assembly 100 according to the embodiment of the present invention, except for a mounting part 360 and a sealing member 380 included therein, only the mounting part 360 and the sealing member 380 will be described below.

The mounting part 360 may include support plates 362 cut from the base member 120 to be bent and protrusion parts 364 protruding so as to support at least one of both sides of a filter member 140.

The support plates 362 may include a first support plate 362a supporting the front surface of the filter member 140 and a second support plate 362b supporting the rear surface thereof. Further, the first and second support plates 362a and 362b may be disposed in a zigzag manner.

That is, the first support plate 362a supporting the front surface of the filter member 140 and the second support plate 362b supporting the rear surface thereof may be disposed to alternate with each other.

Meanwhile, the protrusion part 364 may protrude upwardly to support the side of the filter member 140. Meanwhile, although the case in which the protrusion part 364 has a circular shape when viewed from above is described by way of example in the present embodiment, the present invention is not limited thereto. The protrusion part 364 may have various shapes such as a rectangular shape, and the like.

The sealing members 380 may be installed on a bottom surface of the base member 120 so as to be disposed below the support plates 362. That is, the sealing members 380 may be installed on the base member 120 so as to close regions cut in order to form the support plates 362.

As described above, since the mounting part 360 for mounting the filter member 140 is configured of the support plates 362 and the protrusion parts 364, the configuration of the mounting part 360 may be further simplified.

That is, a separate filter mounting member need not be installed, such that manufacturing costs may be reduced.

Hereinafter, a base assembly according to another embodiment of the present invention will be described with reference to the accompanying drawings. However, the same components as the above-mentioned components will be denoted by the same reference numerals and a detailed description thereof will be omitted.

Figure 5:
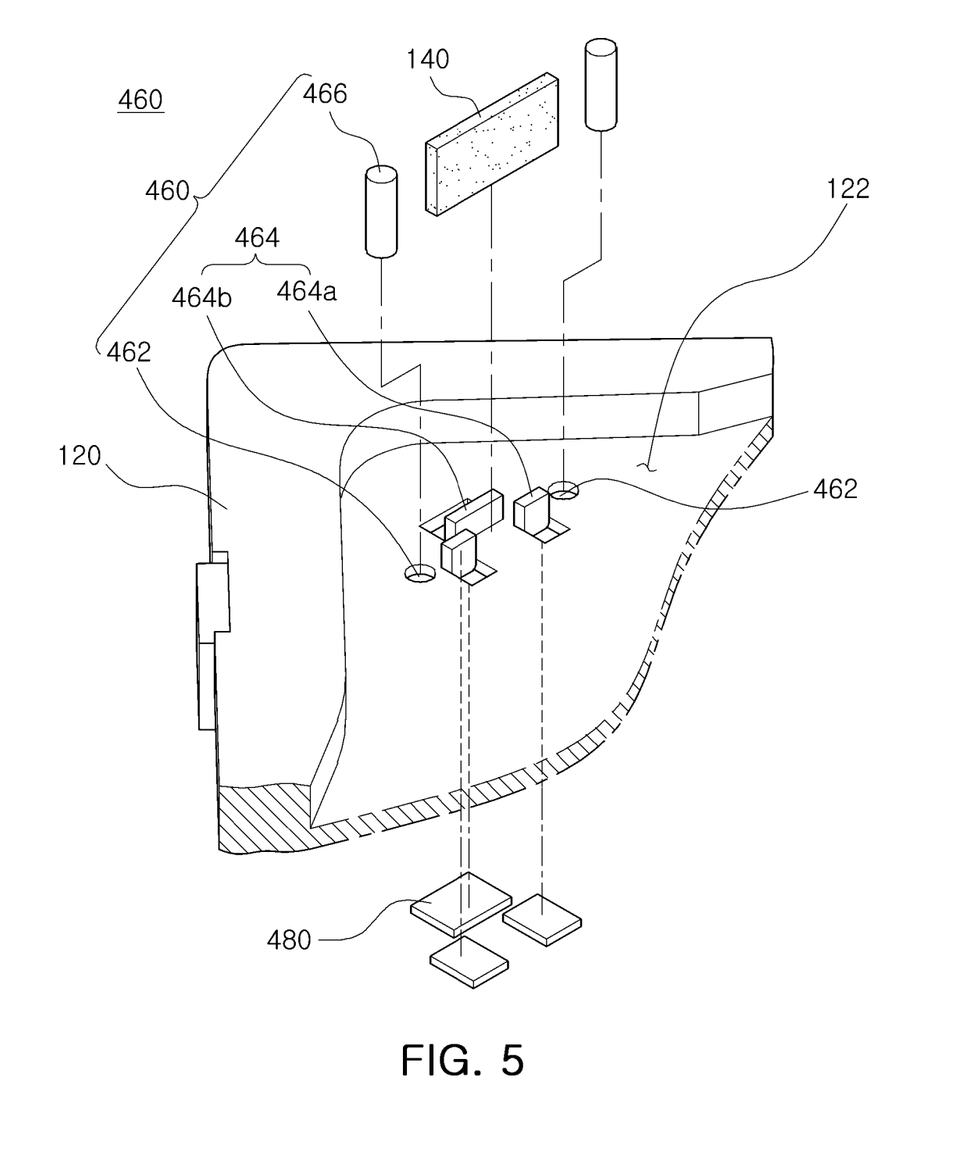
FIG. 5 is an exploded perspective view showing a portion of the base assembly corresponding to part A of FIG. 1 according to another embodiment of the present invention.

FIG. 5 is an exploded perspective view showing a portion of the base assembly corresponding to part A of FIG. 1 according to another embodiment of the present invention.

Meanwhile, since the base assembly according to another embodiment has the same configuration as that of the above-mentioned base assembly 100 according to the embodiment of the present invention, except for a mounting part 460 and a sealing member 480 included therein, only the mounting part 460 and the sealing member 480 will be described below.

The mounting part 460 may include installation holes 462 formed in the base member 120, support plates 464 cut from the base member 120 to be bent, and pin members 466 inserted into the installation holes 462 so as to support at least one of both sides of the filter member 140.

Meanwhile, the support plates 464 may include a first support plate 464a supporting the front surface of the filter member 140 and a second support plate 464b supporting the rear surface thereof. Further, the first and second support plates 464a and 464b may be disposed in a zigzag manner.

That is, the first support plate 464a supporting the front surface of the filter member 140 and the second support plate 464b supporting the rear surface thereof may be disposed to alternate with each other.

In addition, the pin members 466 may be insertedly installed in the installation holes 462 to serve to support the sides of the filter member 140.

Meanwhile, although the case in which cross-sections of the pin members 466 have a circular shape is described by way of example in the present embodiment, the present invention is not limited thereto. That is, the cross-sections of the pin members 466 may have various shapes.

The sealing members 480 may be installed on the bottom surface of the base member 120 so as to be disposed below the support plates 464. That is, the sealing members 480 may be installed on the base member 120 so as to close regions cut in order to form the support plates 464.

As described above, since the mounting part 460 for mounting the filter member 140 is configured of the installation holes 462, the support plates 464, and the pin members 466, the configuration of the mounting part 460 may be further simplified.

That is, a separate filter mounting member need not be installed, such that manufacturing costs may be reduced.

Hereinafter, a recording disk driving device according to another embodiment of the present invention will be described with reference to the accompanying drawings.

Figure 6:
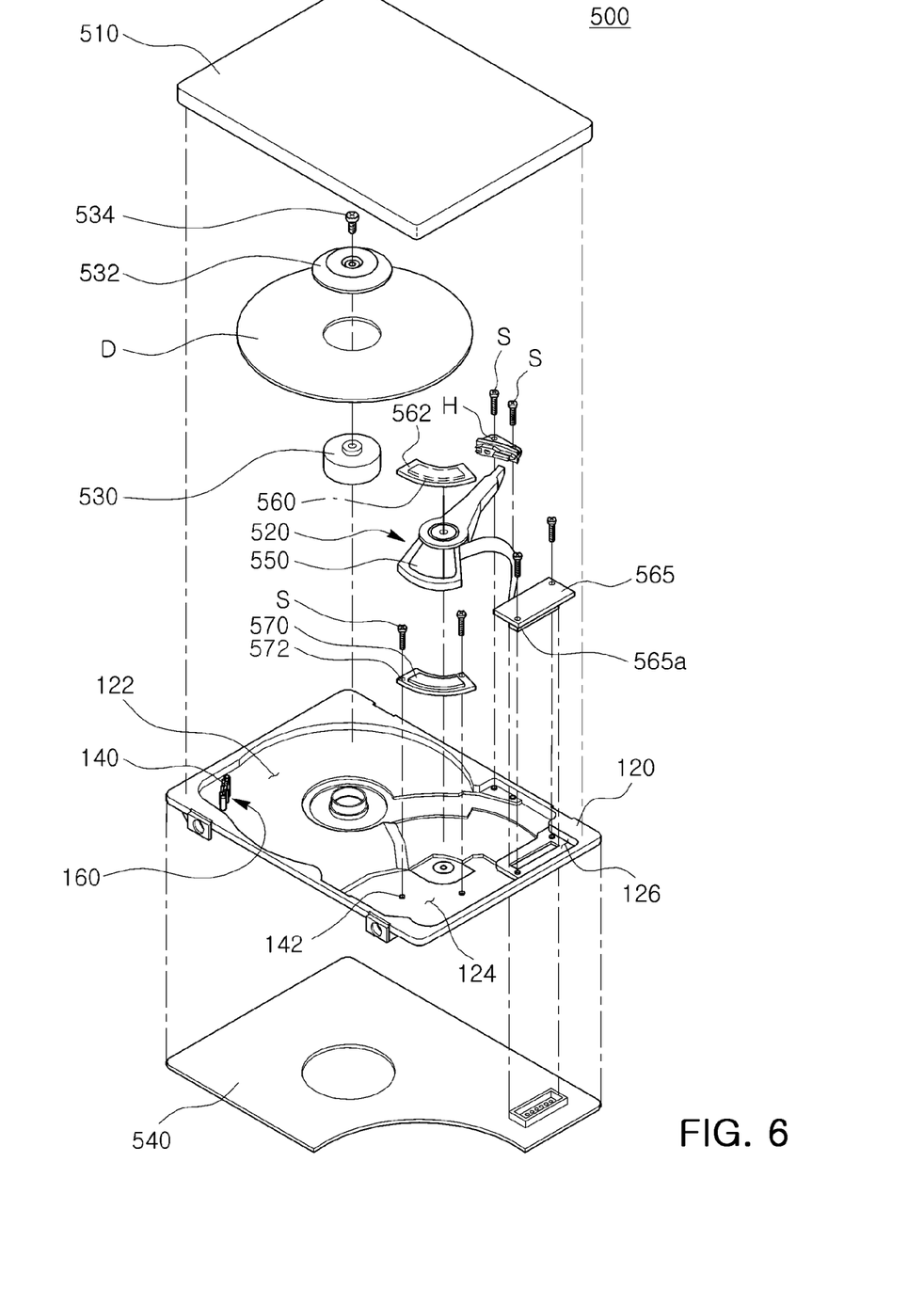
FIG. 6 is an exploded perspective view showing a recording disk driving device according to another embodiment of the present invention.

FIG. 6 is an exploded perspective view showing a recording disk driving device according to an embodiment of the present invention.

Referring to FIG. 6, a recording disk driving device 500 according to the embodiment of the present invention may include, for example, abase assembly 100, a head stack assembly (HSA) 520, a spindle motor 530, and a main circuit board 540.

Meanwhile, the base assembly 100 may include, for example, a base member 120 and a filter member 140, like the above-mentioned base assembly 100 according to the embodiment of the present invention.

However, reference numerals of elements provided in the base assembly 100 are not shown in detail in FIG. 6, and the elements will be described using the same reference numerals as those of FIGS. 1 and 2.

The base member 120 may be formed by plastic processing (for example, press processing). In addition, the base member 120 may form a housing forming an outer casing together with a cover 510 in the recording disk driving device 500.

Meanwhile, the base member 120 may include a disk accommodating part 122, a head stack assembly mounting part 124, and a bracket device mounting part 126.

That is, after the disk accommodating part 122, the head stack assembly mounting part 124, and the bracket device mounting part 126 are formed to have basic shapes by press processing, the shape of the final base member 120 may be formed by additional processing such as bending or cutting.

That is, the base member 120 according to the embodiment of the present invention may be manufactured by performing a single process through press processing or by performing a single process and additional processing, unlike the post-processing scheme according to the related art in which aluminum (Al) is die-cast and burrs, or the like, generated due to the die-casting process, are then removed.

In other words, the base member 120 may be formed by disposing a cold rolled steel sheet (SPCC, SPCE, or the like), a hot rolled steel sheet, a stainless steel sheet, or a lightweight alloy steel sheet such as a boron or magnesium alloy on a press die and applying a predetermined amount of pressure thereto.

As described above, since the base member 120 is formed by the press processing, a processing time and energy consumption may be significantly reduced. As a result, a manufacturing yield may be improved.

Meanwhile, the disk accommodating part 122 is a portion of the base member 120 on which a disk D is disposed, and may have a roughly circular shape so as to correspond to the shape of the disk D. More specifically, the disk accommodating part 122 refers to a portion of the base member 120 partially depressed downwardly so that the disk D is accommodated thereon.

In addition, the head stack assembly mounting part 124 may be disposed adjacently to the disk accommodating part 122 and allow the head stack assembly (HAS) 520 to be mounted thereon.

Further, the bracket device mounting part 126 may be disposed adjacently to the head stack assembly mounting part 124 and allow a bracket device 565 to be mounted thereon.

In addition, the disk accommodating part 122, the head stack assembly mounting part 124, and the bracket device mounting part 126 may be formed simultaneously by the press processing and may be stepped.

Meanwhile, a mounting part 160 for fixedly installing the filter member 140 may be provided in the base member 120. That is, the mounting part 160 may be disposed at an edge portion of the disk accommodating part 122.

In addition, the mounting part 160 may include installation holes 162 formed in the base member 120 and pin members 164 inserted into the installation holes 162.

The plurality of installation holes 162 may be formed at the edge portion of the disk accommodating part 122. That is, the installation holes 162 may be formed to allow the pin members 164 to support a front surface, a rear surface, and at least one of both sides of the filter member 140.

In addition, the pin members 164 may include a plurality of first pin members 164a supporting the front and rear surfaces of the filter member 140 and a second pin member 164b supporting at least one of both sides of the filter member 140.

Further, the first pin member 164a may be formed to be thinner than the second pin member 164b so that air may smoothly pass through the filter member 140.

In addition, the first pin members 164a may be disposed in a zigzag manner. That is, the first pin member 164a supporting the front surface of the filter member 140 and the first pin member 164a supporting the rear surface thereof may be disposed to be alternated with each other.

Meanwhile, although the case in which cross-sections of the first and second pin members 164a and 164b have a circular shape is described by way of example in the present embodiment, the present invention is not limited thereto. That is, the cross-sections of the first and second pin members 164a and 164b may have various shapes.

As described above, since the mounting part 160 for mounting the filter member 140 is configured of the installation holes 162 and the plurality of pin members 164, the configuration of the mounting part 160 may be further simplified.

That is, a separate filter mounting member need not be installed, such that manufacturing costs may be reduced.

The head stack assembly 520 may include a magnetic head mounted thereon and move the magnetic head to a predetermined position to thereby write data to the disk D or read data stored on the disk D.

In addition, the head stack assembly 520 may move the magnetic head to a predetermined position relative to the disk D by a voice coil motor (VCM) including a coil 550 and upper and lower magnets 560 and 570.

Here, the upper and lower magnets 560 and 570 disposed on upper and lower portions of the coil 550 provided in the VCM may be coupled to upper and lower yokes 562 and 572, respectively, in order to increase magnetic flux density and to be fixed to the base member 120.

The VCM may be controlled by a servo control system and rotate the head stack assembly 520 around a pivot axis in a direction according to Fleming's left hand rule through interaction between current input by the coil 550 provided in the VCM and magnetic fields formed by the upper and lower magnets 560 and 570.

Here, an operation of the head stack assembly 520 will be schematically described. First, when an operation start command is input, the disk D starts to rotate, and the VCM rotates a swing arm in a counterclockwise direction to move the magnetic head onto a writing surface of the disk D.

In addition, when an operation stop command is input, the VCM rotates the swing arm in a clockwise direction to allow the magnetic head to be removed from a position above the disk D.

Meanwhile, the magnetic head removed from the writing surface of the disk D is parked in a ramp disposed outside of the disk D.

Here, the ramp may allow the magnetic head to be spaced apart from the disk D by a predetermined interval in the case in which the magnetic head moves to the disk D, while allowing the magnetic head to be parked therein, whereby data from the disk D may be stably read.

In addition, the head stack assembly 520 may be electrically connected to the main circuit board 540 disposed on a bottom surface of the base member 120 so as to provide driving force to the VCM to rotate the swing arm.

Such a connection may be implemented via the bracket device 565 including a terminal 565a. That is, the main circuit board 540 and the head stack assembly 520 may be electrically connected to each other by the bracket device 565.

Meanwhile, the bracket device 565 may be one component of the head stack assembly (HAS) 520 and may include a connecter (not shown) for connecting the head stack assembly 520 to the main circuit board 540 disposed on the bottom surface of the base member 120.

Meanwhile, the spindle motor 530, provided to rotate the disk D, may be fixedly installed in a central portion of the disk accommodating part 122 of the base member 120.

The disk D may be mounted on the spindle motor 530 to thereby be rotated by driving of the spindle motor 530 and include the writing surface to which data are written.

Further, a clamp 532 may be coupled to an upper end portion of the spindle motor 530 by a screw 534, thereby allowing the disk D to be firmly fixed to the spindle motor 530.

In addition, although FIG. 6 shows a state in which a single disk D is mounted on the spindle motor 530, the present invention is not limited thereto. That is, one or more disks D may be mounted on the spindle motor 530.

Further, in the case in which a plurality of disks D are mounted on the spindle motor 530, a ring shaped spacer may be disposed between respective disks among the plurality of disks D in order to maintain intervals therebetween.

As described above, since the mounting part 160 for mounting the filter member 140 is configured of the installation holes 162 and the plurality of pin members 164, the configuration of the mounting part 160 may be further simplified.

That is, a separate filter mounting member need not be installed, such that manufacturing costs may be reduced.

In the recording disk driving device 500 according to the present embodiment of the invention, the base assembly 100 according to the above-described embodiment is used by way of example. However, the present invention is not limited thereto. The base assembly according to the other embodiments of the present invention may be used therein.

As set forth above, according to embodiments of the present invention, the mounting part for installing the filter member may be formed of the pin members, the support plates, or the like, whereby manufacturing costs may be reduced.

While the present invention has been shown and described in connection with the embodiments, it will be apparent to those skilled in the art that modifications and variations can be made without departing from the spirit and scope of the invention as defined by the appended claims.

What is claimed is:

1. A base assembly comprising:
    a base member having a disk accommodating part onto which a disk is insertedly disposed; and
    a filter member installed on the base member so as to be disposed adjacently to the disk,
    wherein the base member is formed by performing plastic processing on a steel sheet and includes a mounting part for fixedly installing the filter member,
    wherein the mounting part includes an installation hole in the base member and a pin member insertedly installed in the installation hole.

2. The base assembly of claim 1, wherein the pin member includes a plurality of first pin members supporting front and rear surfaces of the filter member and a second pin member supporting at least one of both sides of the filter member.

3. The base assembly of claim 2, wherein the plurality of first pin members are disposed in a zigzag manner and formed to be thinner than the second pin member.

4. The base assembly of claim 1, wherein the mounting part further includes a protrusion part protruding so as to support at least one of both sides of the filter member.

5. The base assembly of claim 4, wherein the pin member includes a plurality of pin members supporting front and rear surfaces of the filter member and disposed in a zigzag manner.

6. A recording disk driving device comprising:
    the base assembly of claim 1;
    a head transfer part transferring a head reading information stored on a recording disk to a position above the recording disk; and
    a housing forming a space for receiving the head transfer part together with the base assembly.

7. A base assembly comprising:
    a base member having a disk accommodating part onto which a disk is insertedly disposed; and
    a filter member installed on the base member so as to be disposed adjacently to the disk,
    wherein the base member is formed by performing plastic processing on a steel sheet and includes a mounting part for fixedly installing the filter member, and wherein the mounting part includes a support plate cut from the base member to be bent and a protrusion part protruding so as to support at least one of both sides of the filter member.

8. The base assembly of claim 7, wherein the support plate includes a first support plate supporting one surface of the filter member and a second support plate supporting the other surface of the filter member, and the first and second support plates are disposed in a zigzag manner.

9. The base assembly of claim 7, further comprising a sealing member installed on a bottom surface of the base member to be disposed below the support plate.

10. A base assembly comprising:
   a base member having a disk accommodating part onto which a disk is insertedly disposed; and
   a filter member installed on the base member so as to be disposed adjacently to the disk,
   wherein the base member is formed by performing plastic processing on a steel sheet and includes a mounting part for fixedly installing the filter member, and
   wherein the mounting part includes an installation hole formed in the base member, a support plate cut from the base member to be bent, and a pin member insertedly installed in the installation hole so as to support at least one of both sides of the filter member.

11. The base assembly of claim 10, wherein the support plate includes a first support plate supporting one surface of the filter member and a second support plate supporting the other surface of the filter member, and the first and second support plates are disposed in a zigzag manner.

* * * * *